United States Patent
Underwood

[15] 3,678,231
[45] July 18, 1972

[54] APPARATUS FOR DETECTING RAPID CHANGE OF FLUID PRESSURE

[72] Inventor: Michael John Underwood, Croydon, England

[73] Assignee: Negretti & Zambra (Aviation) Limited, Croydon, England

[22] Filed: July 26, 1971

[21] Appl. No.: 166,215

[30] Foreign Application Priority Data

July 28, 1970 Great Britain......................36,533/70

[52] U.S. Cl..............................200/81 R, 200/83 R, 73/507, 318/456
[51] Int. Cl....................................H01h 35/24, H01h 35/32
[58] Field of Search..................200/61.46, 61.39, 38 E, 81 R, 200/83 R; 73/507, 521; 318/481, 456; 340/268; 337/314; 338/41, 42

[56] References Cited

UNITED STATES PATENTS

| | | |
|---|---|---|
| 2,358,803 | 9/1944 | Hanson et al.........................200/83 X |
| 2,850,588 | 9/1958 | Weiss...................................200/61.46 |
| 2,963,635 | 12/1960 | Frantz......................................318/481 |
| 3,132,266 | 5/1964 | Richardson et al. ............200/61.46 X |
| 3,180,156 | 4/1965 | Harris.................................340/268 X |

FOREIGN PATENTS OR APPLICATIONS 840,236    7/1960    Great Britain .......................200/83 R Primary Examiner—Robert K. Schaefer
Assistant Examiner—Robert A. Vanderhye

[57] ABSTRACT

An apparatus for detecting a rapid change in fluid pressure such as occurs in aircraft engine failure, comprises means such as a capsule for transforming pressure change into a velocity and means such as an electric motor for producing a reference velocity. The two velocities so produced are compared or differentiated and a signal is produced when the velocities differ by more than a predetermined amount. The signal can be adapted to actuate automatically a re-light sequence for an aircraft engine.

13 Claims, 1 Drawing Figure

PATENTED JUL 18 1972 3,678,231
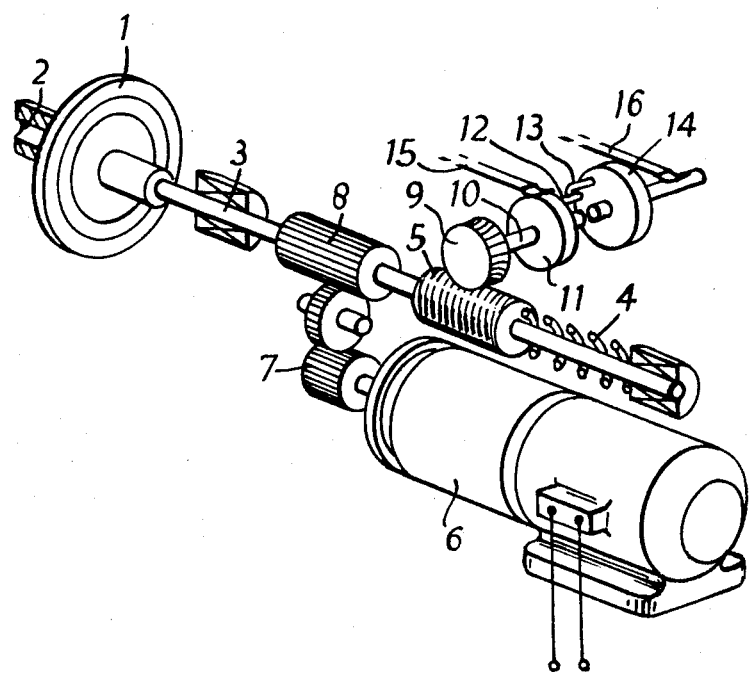

APPARATUS FOR DETECTING RAPID CHANGE OF FLUID PRESSURE

BACKGROUND OF THE INVENTION

This invention relates to apparatus for detecting rapid change of fluid pressure, and has particular application to the detection of aircraft engine flame-out.

In aircraft engines, and particularly jet engines or turbines, which incorporate a compressor, it is well known that if "flame-out", i.e. engine failure, occurs, the compressor delivery pressure will decay. The delivery pressure after flame-out drops fairly rapidly but the rate of decay depends on the pressure being generated by the compressor at the moment when flame-out occurs. It is, therefore, important to provide a system which will automatically detect a rate of decay in excess of those which might be incurred in normal speed reductions, even in maximum operational deceleration, and to actuate a re-light sequence in such an abnormal event.

It is an object of the invention to provide an apparatus for detecting rapid change in fluid pressure, which can thus detect and may also act to rectify flame-out in aircraft engines.

SUMMARY OF THE INVENTION

In accordance with the present invention there is provided an apparatus for detecting a rapid change in fluid pressure, comprising transforming means for transforming the change in fluid pressure into a velocity, means for producing a reference velocity, means for comparing or differentiating between the first-mentioned velocity and said reference velocity, and means for producing a signal when said velocities differ by more than a predetermined amount. The apparatus may be set to produce a signal when the rate of change of fluid pressure exceeds a predetermined value which may or may not be related to the pressure of the fluid at the time when the transient occurs.

Suitably, said means for producing a reference velocity comprise an electric or other motor arranged to rotate a first electrical contact which normally engages a second moveable contact, and said transforming means comprise a pressure-sensitive element which expands and contracts under fluid pressure change to produce said first-mentioned velocity and influence the movement of one of said contacts whereby the contacts will break when the first-mentioned velocity exceeds a predetermined difference from said reference velocity.

In one form, as applied to monitoring of an aircraft engine, the electric motor is arranged to rotate the worm of a worm-gear, said pressure-sensitive element comprises a capsule or bellows arranged to move the worm axially, and said first electrical contact is driven through the worm-wheel by rotation of the worm so as to break with the said second contact when the algebraic of the respective motions imparted by the duplex action of the worm causes the worm-wheel to reverse its direction of rotation. Breaking of the contact will open an electric circuit which will automatically actuate a re-light sequence for the engine.

Preferably, said electric motor is constant-speed and said element is non-linear in operation.

BRIEF DESCRIPTION OF THE DRAWINGS

The drawing is a diagrammatic perspective view showing apparatus for use in detecting and rectifying aircraft engine flame-out.

DESCRIPTION OF THE PREFERRED EMBODIMENT

Referring to the drawing, the apparatus comprises a pressure-sensitive capsule 1 which is subjected to engine compressor delivery pressure through pipe 2. A freely-rotatable sliding rod 3 is urged against the closed face of the capsule 1 and by a spring H which bears against a worm 5 secured to the rod.

A constant speed electric motor 6, having a driving pinion 7, drives an elongated pinion 8 through an intermediate pinion. The pinion 8 is secured on the shaft 3 so that operation of the motor 6 will rotate the worm 5.

A worm wheel 9 secured on a shaft 10 is rotated by the worm 5, and thus a disc 11 which is also secured on the shaft 10 is rotated. The disc 11 carries an electric contact finger 12 which engages a corresponding finger 13 on a disc 14 and, thus, rotates the disc 14 against suitable frictional resistance. Wipers 15 and 16 provide electrical connections to the discs 11 and 14 which are electrically insulated from each other, except through the contacts fingers 12 and 13.

During normal operation of the aircraft engine, the motor 6 drives the worm-wheel 9 which rotates slowly in an anti-clockwise direction as shown in the drawing. Rotation of the worm-wheel drives the disc 14 through the action of the abutting fingers 12 and 13 which, being in contact, close the electrical circuit which incorporates the wipers 15 and 16. Variations in compressor pressure incurred during normal engine operation produce axial movement of the shaft 3, and the corresponding axial movement of the worm 5, which is loaded by the compression spring 4, increased or decreases the speed of rotation of the worm-wheel 9. In the case of flame-out, however, a much more rapid drop in pressure occurs. The resulting rapid axial movement of the worm 5 (to the left in the drawing), produces a reversal of the direction of rotation of the worm-wheel 9 which turns clockwise and thus breaks the contact between the fingers 12 and 13. Opening of the electrical circuit instantaneously operates a re-light sequence for the engine, and suitably also operates a warning device.

In the above apparatus, the capsule 1 operates in a non-linear manner to compensate for variations in rates of pressure decay when flame-out occurs at varying values of compressor delivery pressure. Alternatively, the capsule may be of a linear type and the motor 6 may vary in speed in accordance with engine speed and/or compressor delivery pressure. Thus, the apparatus will operate appropriately at various pressure levels, and units may be calibrated to this end.

The above apparatus does not suffer the disadvantages which would be incurred in a comparable device operating in a manner which is dependent on precise frictional resistance or constant gas pressure, as both of these values may vary substantially during the relatively large changes in ambient atmospheric conditions which occur during aircraft flight.

Modifications may, of course, be made without departing from the scope of the invention. For example, the electric motor 6 may rotate a contact finger which drives a further contact finger carried by a rotary plate. The plate forms one side of a friction clutch and a second plate on the other side of the clutch is arranged to be turned, for example through an arcuate rack and pinion system, on expansion and contraction of the capsule 1. In this case, the rotary plate is rotated slowly in one direction by the electric motor until, on flame-out, the rapid contraction of the capsule rotates the second plate and, through the clutch, the rotary plate in the opposite direction to separate the contact fingers.

It will also be appreciated that the apparatus described above, with possible appropriate modifications, may be employed for the detection of positive or negative changes in pressure or of the attainment of predetermined pressures in systems other than in relation to aircraft engines.

In a modification, the two electrical contact fingers are normally open, and are arranged to move together suitably by a predetermined amount, and close when the capsule produces a velocity which is effectively greater than that produced by the electric motor.

In a further modification the signal is produced, either by electrical contacts opening or closing, or otherwise, when the changable velocity and the reference velocity become equal.

I claim:

1. An apparatus for detecting a rapid change in fluid pressure, comprising transforming means which transform the change in fluid pressure into a velocity, means which produce a reference velocity, means which compare or differentiate between the first-mentioned velocity and said reference velocity, and means which produce a signal when said velocities differ by more than a predetermined amount.

2. An apparatus according to claim 1, in which said means produce the signal when said first-mentioned velocity effectively exceeds said reference velocity.

3. An apparatus according to claim 1, in which said means produce the signal after a predetermined time which is related to the amount by which the velocities differ.

4. An apparatus according to claim 1, in which means are provided to regulate the operational speed of said means for producing a reference velocity and to change the calibration of the apparatus.

5. An apparatus according to claim 1, in which said means for producing a reference velocity comprise a device which moves a first electrical contact, a second movable contact is normally engaged by said first contact, and said transforming means comprise a pressure-sensitive element which expands and contracts under fluid pressure change to produce said first-mentioned velocity and influence the movement of one of said contacts so that the contacts break when the first-mentioned velocity exceeds said reference velocity.

6. An apparatus according to claim 5, in which said means which compare or differentiate comprise having a worm which is rotated by said device, said pressure-sensitive element comprises a capsule which moves the worm axially, and said first electrical contact is driven through the worm-wheel of the worm-gear by rotation of the worm to break with the said second contact when the algebraic sum of the respective motions imparted by the duplex action of the worm causes the worm-wheel to reverse its direction of rotation.

7. An apparatus according to claim 5, in which said device is constant-seed and said element is non-linear in operation.

8. An apparatus according to claim 1, in which said means for producing a reference velocity comprise a device which moves a first electrical contact and said means for comparing a differentiating comprise a clutch device of which one side carries a further electrical contact normally driven by said first electrical contact, and the other side of said clutch device is actuated by said transforming means to rotate and separate the contact fingers when rapid movement is produced by said transforming means.

9. An apparatus according to claim 1, in which said means for producing a reference velocity comprise a device which moves a first electrical contact, and a second electrical contact is moved by said first contact through a connecting mechanism, and said transforming means act on said second contact to produce said signal when the action of said transforming means causes said second contact to close with said first contact.

10. An apparatus according to claim 9, in which said connecting mechanism incorporates a clutch.

11. An apparatus according to claim 5, which said device comprises an electric motor.

12. An apparatus for detecting the attainment of a predetermined pressure in a fluid which is subject to pressure change, the apparatus comprising means which transform change in fluid pressure into a velocity, means which produce a reference velocity, means which compare or differentiate between the first-mentioned velocity and said reference velocity, and means which produce a signal whenever said first-mentioned velocity exceeds said predetermined velocity.

13. An apparatus according to claim 1, and adapted for monitoring an aircraft or other engine provided with a compressor, in which a re-light sequence for the engine is adapted to be actuated by said signal.

* * * * *